United States Patent
Kim et al.

(10) Patent No.: US 10,871,500 B2
(45) Date of Patent: Dec. 22, 2020

(54) VEHICLE AND A CONTROL METHOD THEREOF

(71) Applicants: HYUNDAI MOTOR COMPANY, Seoul (KR); KIA MOTORS CORPORATION, Seoul (KR)

(72) Inventors: SungYun Kim, Seoul (KR); Sukki Min, Suwon-si (KR); Jongmo Kim, Goyang-si (KR); DaeHwan Kim, Suwon-si (KR); Bongchul Ko, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 242 days.

(21) Appl. No.: 15/949,829

(22) Filed: Apr. 10, 2018

(65) Prior Publication Data
US 2019/0170784 A1 Jun. 6, 2019

(30) Foreign Application Priority Data
Dec. 5, 2017 (KR) .................. 10-2017-0165819

(51) Int. Cl.
*G01P 1/12* (2006.01)
*G01P 7/00* (2006.01)
*B60W 40/105* (2012.01)
*B60W 50/00* (2006.01)

(52) U.S. Cl.
CPC ............. *G01P 1/12* (2013.01); *B60W 40/105* (2013.01); *B60W 50/00* (2013.01); *G01P 7/00* (2013.01); *B60W 2050/002* (2013.01); *B60W 2050/0022* (2013.01); *B60W 2510/182* (2013.01); *B60W 2520/28* (2013.01); *B60W 2520/30* (2013.01); *B60W 2552/40* (2020.02)

(58) Field of Classification Search
CPC ...................................... G01P 1/12; G01P 7/00
USPC ............................................................ 73/489
See application file for complete search history.

(56) References Cited

U.S. PATENT DOCUMENTS

| 5,719,770 A | 2/1998 | Matsuno |
| 6,591,668 B1 | 7/2003 | Becherer et al. |
| 8,527,177 B2 | 9/2013 | Linda et al. |
| 2010/0211255 A1* | 8/2010 | Takenaka ................ B60T 8/172 701/31.4 |

(Continued)

FOREIGN PATENT DOCUMENTS

| JP | H04293651 | 10/1992 |
| JP | H06222066 | 8/1994 |

(Continued)

*Primary Examiner* — John Fitzgerald
*Assistant Examiner* — Rodney T Frank
(74) *Attorney, Agent, or Firm* — Lempia Summerfield Katz LLC (57) ABSTRACT

A vehicle, and a method of controlling a vehicle, is capable of selecting a wheel speed that is most appropriate to obtain a speed of the vehicle from among wheel speeds of the vehicle to obtain an accurate speed of the vehicle. The vehicle includes a sensor configured to obtain wheel speed information of at least one wheel. The vehicle also includes a controller configured to select wheel speed information from among the wheel speed information of the at least one wheel based on a driving state of the vehicle and configured to determine a speed of the vehicle based on the selected wheel speed information.

10 Claims, 10 Drawing Sheets

(56) References Cited

U.S. PATENT DOCUMENTS

| | | | |
|---|---|---|---|
| 2010/0211256 A1* | 8/2010 | Takenaka | B60T 8/172 701/31.4 |
| 2012/0016646 A1* | 1/2012 | Takenaka | B60T 8/172 703/2 |
| 2012/0029783 A1* | 2/2012 | Takenaka | B60T 8/172 701/73 |

FOREIGN PATENT DOCUMENTS

| | | |
|---|---|---|
| KR | 100061000 | 12/1992 |
| KR | 100149701 | 9/1998 |
| KR | 100267641 | 10/2000 |
| KR | 1020120059817 | 6/2012 |

* cited by examiner

VEHICLE AND A CONTROL METHOD THEREOF

CROSS-REFERENCE TO RELATED APPLICATION

This application is based on and claims priority under 35 U.S.C. § 119 to Korean Patent Application No. 10-2017-0165819, filed on Dec. 5, 2017 in the Korean Intellectual Property Office, the disclosure of which is incorporated by reference herein in its entirety.

BACKGROUND

1. Field

The present disclosure relates to a technique for obtaining the speed of a vehicle based on a wheel speed.

2. Description of the Related Art

Typically, the speed of a vehicle was estimated by estimating disturbance, such as a road slope and running resistance, to correct deflecting errors of acceleration, and then integrating the acceleration. The deflecting errors include gravity deflecting errors and initial deflecting errors.

In other words, typically, the speed of a vehicle was estimated by correcting errors of acceleration and integrating the corrected acceleration. However, there was an underlying problem that cumulative errors are generated upon integration.

Meanwhile, a vehicle can travel in all-wheel drive, front-wheel drive, or in two-wheel or rear-wheel drive. A method of selecting a wheel speed for obtaining the speed of the vehicle depends on the drive method in which the vehicle travels. However, criterion for selecting a wheel speed has never been suggested.

SUMMARY

Accordingly, definite criterion for selecting a wheel speed required to obtain the speed of a vehicle need to be suggested.

Therefore, it is an aspect of the present disclosure to provide a vehicle capable of selecting a wheel speed that is most appropriate to obtain a speed of the vehicle from among wheel speeds of the vehicle to obtain an accurate speed of the vehicle. It is also an aspect of the present disclosure to provide a method for controlling the vehicle.

Additional aspects of the disclosure are set forth in part in the description which follows and, in part, will be understood from the description, or may be learned by practice of the disclosure.

In accordance with an aspect of the present disclosure, a vehicle includes a sensor configured to obtain wheel speed information of at least one wheel. The vehicle also includes a controller configured to select wheel speed information from among the wheel speed information of the at least one wheel based on a driving state of the vehicle and to determine a speed of the vehicle based on the selected wheel speed information.

The controller may select wheel speed information including a slowest wheel speed from among the wheel speed information of the at least one wheel if the driving state of the vehicle is determined as a state in which a driving force is generated.

The controller may select wheel speed information including a wheel speed of the wheel to which the driving force is not transferred if a wheel to which the driving force is not transferred exists in the at least one wheel, i.e., is a wheel among the at least one wheel or wheels.

The controller may select wheel speed information including a fastest wheel speed from among the wheel speed information of the at least one wheel if the driving state of the vehicle is determined as a state in which a brake force is generated.

The controller may apply a weight to the wheel speed information of the at least one wheel based on brake pressure applied to the at least one wheel if the driving state of the vehicle is determined as a state in which a predetermined brake control is applied.

The controller may apply a predetermined weight to the selected wheel speed information, determine acceleration of the vehicle based on the wheel speed information to which the predetermined weight is applied, and integrate the acceleration of the vehicle to determine a speed of the vehicle.

The controller may obtain a friction coefficient of a road on which the vehicle travels and may change the weight based on a magnitude of the friction coefficient.

The controller may change the weight based on brake pressure applied to the at least one wheel.

In accordance with an aspect of the present disclosure, a method of controlling a vehicle includes: obtaining wheel speed information of at least one wheel; selecting wheel speed information from among the wheel speed information of the at least one wheel based on a driving state of the vehicle; and determining a speed of the vehicle based on the selected wheel speed information.

The selecting of the wheel speed information from among the wheel speed information of the at least one wheel may comprise selecting wheel speed information including a slowest wheel speed from among the wheel speed information of the at least one wheel if the driving state of the vehicle is determined as a state in which a driving force is generated.

The selecting of the wheel speed information from among the wheel speed information of the at least one wheel may comprise selecting wheel speed information including a wheel speed of the wheel to which the driving force is not transferred if a wheel to which the driving force is not transferred exists in the at least one wheel, i.e., is a wheel among the at least one wheel or wheels.

The selecting of the wheel speed information from among the wheel speed information of the at least one wheel may comprise selecting wheel speed information including a fastest wheel speed from among the wheel speed information of the at least one wheel if the driving state of the vehicle is determined as a state in which a brake force is generated.

The determining of the speed of the vehicle may comprise applying a weight to the wheel speed information of the at least one wheel based on brake pressure applied to the at least one wheel if the driving state of the vehicle is determined as a state in which a predetermined brake control is applied.

The determining of the speed of the vehicle may comprise: applying a predetermined weight to the selected wheel speed information; determining acceleration of the vehicle based on the wheel speed information to which the predetermined weight is applied; and integrating the acceleration of the vehicle to determine a speed of the vehicle.

The determining of the speed of the vehicle may comprise: obtaining a friction coefficient of a road on which the vehicle travels; and changing the weight based on a magnitude of the friction coefficient.

The determining of the speed of the vehicle may comprise changing the weight based on brake pressure applied to the at least one wheel.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numbers refer to like elements throughout this specification. This specification does not describe all components of the embodiments. General information in the technical field to which the present disclosure belongs or overlapping information between the embodiments is not described herein. The terms "portion", "module", "element", and "block", as used herein, may be implemented as software or hardware. According to embodiments of the present disclosure, a plurality of "portion", "module", "element", and "block" may be implemented as a single component, or a single "portion", "module", "element", and "block" may include a plurality of components.

It should be understood that when a component is referred to as being "connected" to another component, it can be directly or indirectly connected to the other component. When a component is indirectly connected to another component, it may be connected to the other component through a wireless communication network.

Also, it should be understood that the terms "includes," "comprises," "including," and/or "comprising," when used in this specification, specify the presence of a stated component, but do not preclude the presence or addition of one or more other components.

In the entire specification, it should also be understood that when an element is referred to as being "on" or "over" another element, it can be directly on the other element or intervening elements may also be present.

It should be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations. The operations can be executed in a different order from the stated order unless a specific order is definitely specified in the context.

Hereinafter, an operation principle and embodiments of the present disclosure are described with reference to the accompanying drawings.

Figure 1:
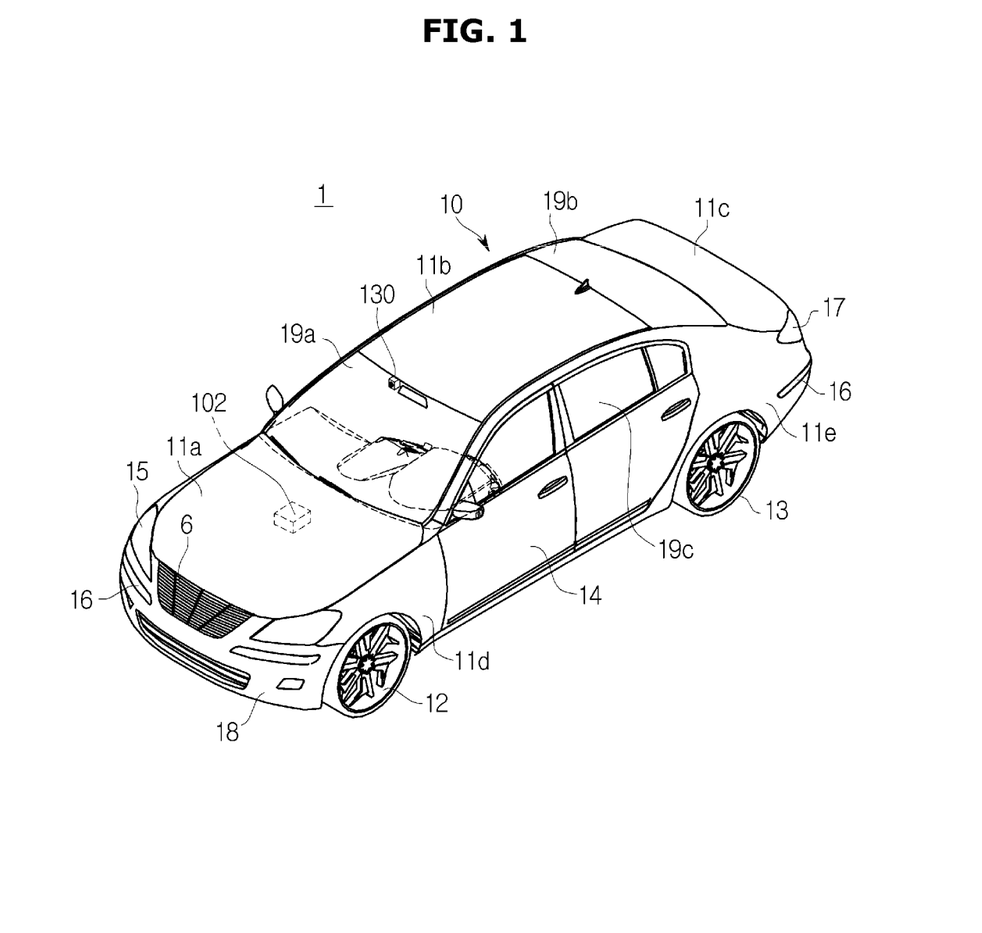
FIG. 1 shows an outer appearance of a vehicle according to an embodiment of the present disclosure.

FIG. 1 shows an outer appearance of a vehicle according to an embodiment of the present disclosure.

Referring to FIG. 1, a vehicle 1 may include a body 10 forming an outer appearance of the vehicle. The vehicle 1 may also include a plurality of wheels 12 and 13 for moving the vehicle 1.

The body 10 may include a hood 11a to protect various devices (for example, an engine) required for driving the vehicle 1. The body 10 may also include a roof panel 11b forming the internal space of the vehicle 1, a trunk lid 11c to cover a trunk area and define a storage space and front fenders 11d and quarter panels 11e provided at both sides of the vehicle 1. Also, a plurality of doors 14 may be coupled with the body 10 by hinges and may be provided at both sides of the body 10.

A front window 19a may be provided between the hood 11a and the roof panel 11b to provide a front view of the vehicle 1 and a rear window 19b may be provided between the roof panel 11b and the trunk lid 11c to provide a rear view of the vehicle 1. Also, a plurality of side windows 19c may be provided at the upper portions of the doors 14 to provide side views of the body 10.

A plurality of headlamps 15 may be provided at the front portion of the vehicle 1 to irradiate light in a heading direction of the vehicle 1.

Also, a plurality of turn signal lamps 16 may be provided at the front and back portions of the vehicle 1 to inform a movement direction of the vehicle 1.

The vehicle 1 may make one of the turn signal lamps 16 blink to inform a movement direction of the vehicle 1. Also, a plurality of tail lamps 17 may be provided at the back portion of the vehicle 1. The tail lamps 17 may inform a gear shifting state, a brake operation state, and the like of the vehicle 1.

In the inside of the vehicle 1, at least one controller 102 (see FIG. 3) may be provided. The controller 102 may perform electronic control related to operations of the vehicle 1. The controller 102 may be installed at an arbitrary location inside the vehicle 1 according to a designer's selection. For example, the controller 102 may be installed between an engine compartment and a dashboard, or in the inside of a center fascia. The controller 102 may include at least one processor to receive electrical signals, to process the received electrical signals, and then to output the processed signals. The at least one processor may be implemented with at least one semiconductor chip and the related components. The at least one semiconductor chip and the related components may be mounted on a Printed Circuit Board (PCB) that can be installed in the inside of the vehicle 1. Also, the vehicle 1 may include an imaging camera 130 (see FIG. 2) to acquire images required for autonomous driving of the vehicle 1.

Figure 2:
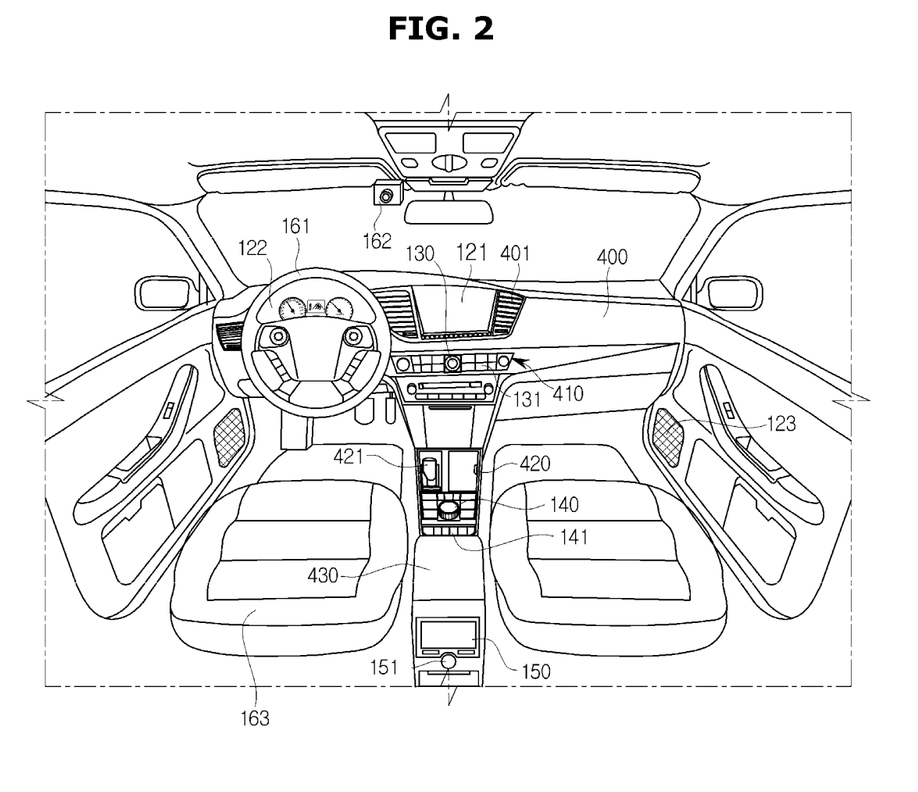
FIG. 2 shows the interior of a vehicle according to an embodiment of the present disclosure.

FIG. 2 shows the interior of a vehicle according to an embodiment of the present disclosure, such as the vehicle 1 in FIG. 1.

Referring to FIG. 2, the inside of the vehicle 1 may include a dashboard 400, a center fascia 410 extending from the dashboard 400, a gear box 420 installed below the center fascia 410, and a console box 430 installed behind the gear box 420.

The dashboard 400 may function to partition the inside space of the vehicle 1 from an engine compartment. A steering wheel 161, an instrument panel 122, an exhaust opening 401, and the like may be installed in the dashboard 400.

The steering wheel 161 may be disposed on the dashboard 400 around a driver's seat 163. The steering wheel 161 may include a rim that is gripped by a driver and a spoke connecting the rim to a hub of a steering apparatus of the vehicle 1 located on a rotation shaft for steering. A driver may manipulate the rim to rotate the spoke to change the heading direction of the wheels 12 and 13, thereby adjusting a driving direction of the vehicle 1. Also, various input devices for controlling a radio apparatus, a communication apparatus for vehicle, or the instrument panel 122, and the like may be provided in or on the spoke. Also, an input device, such as a scroll wheel, a button, a knob, a touch screen, a touch pad, a lever, a trackball, an operation sensor, or a voice recognition sensor, and the like, may be installed in the spoke.

The instrument panel 122 may display a driving speed of the vehicle 1, the Revolutions Per Minute (RPM) of the engine, the amount of remaining fuel, a Distance to Empty (DTE), and the like. The instrument panel 122 may be installed, generally, in the dashboard 400 located in front of the steering wheel 161. According to some embodiments, the instrument panel 122 may be disposed at various locations, such as another location on the dashboard 400 or the center fascia 410. An air vent or exhaust opening 401 may discharge air of predetermined temperature to the inside of the vehicle 1 according to operation of an air conditioner to adjust the inside temperature of the vehicle 1. The exhaust opening 401 may be installed at various locations in the dashboard 400. For example, the exhaust opening 401 may be installed at both sides of a display 121, as shown in FIG. 2.

The display 121 may be installed on the upper frame of the dashboard 400. The display 121 may output various images, such as moving images or still images, for a user. Also, the display 121 may display information required for driving, as images. For example, the display 121 may display a map showing the surroundings of the vehicle 1, or a moving course of the vehicle 1. The display 121 may be, for example, a navigation system. The display 121 may include a display panel and an external housing to fix the display panel. In the sides or rear portion of the external housing, a fixing means (not shown) may be provided to fix the external housing at a predetermined location in the inside of the vehicle 1, for example, on the dashboard 400. If the display 121 is disposed on the upper portion of the dashboard 400, passengers as well as the driver may be able to see a screen displayed on the display 121.

A center fascia 410 may be disposed between the dashboard 400 and the gear box 420. The center fascia 410 may include at least one of a scroll wheel, a button, a knob, a touch screen, a touch pad, a lever, and a trackball to enable a user, such as a driver or a passenger, to input various commands for manipulating various functions of the vehicle 1. Below the center fascia 410, a gear box 420 may be disposed in which a gear apparatus is installed. A gear shift lever 421 for shifting gears may protrude from the gear box 420. Also, in the gear box 420, an input device may be provided to enable the driver to input various commands for manipulating various functions of the vehicle 1.

Behind the gear box 420, a console box 430 may be provided. The console box 430 may provide predetermined space to store various things.

Also, in the inside of the vehicle 1, a speaker 123 may be provided to output sound. Accordingly, the vehicle 1 may output sound required for performing an audio function, a video function, a navigation function, and other additional functions, through the speaker 123.

The vehicle 1 may include at least one speaker to output sound to the outside of the vehicle 1, in addition to the speaker 123 for outputting sound to the inside of the vehicle 1, in order to output various sound for making pedestrians or drivers of other vehicles recognize the vehicle 1.

Figure 3:
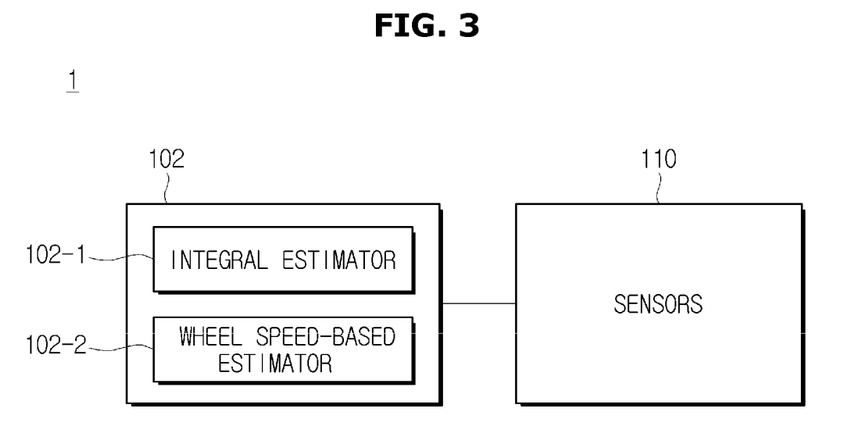
FIG. 3 is a control block diagram of a vehicle according to an embodiment of the present disclosure.

FIG. 3 is a control block diagram of a vehicle according to an embodiment of the present disclosure, such as the vehicle 1 as described above.

Referring to FIG. 3, the vehicle 1 may include a plurality of sensors 110 and the controller 102.

The sensors 110 may obtain wheel speed information of at least one wheel. The sensors 110 may be wheel speed sensors installed in brakes of the vehicle 1. The sensors 110 are described in detail hereinbelow.

The controller 102 may select at least one wheel speed information, data, data point, parameter, or the like from among wheel speed information of the at least one wheel, based on a driving state of the vehicle 1. The controller 102 may determine a speed of the vehicle 1 based on the selected wheel speed information.

The driving state of the vehicle 1 may include the RPM of the wheels 12 and 13, driving torque, a road friction coefficient, tire inflation pressure, and the like.

If the controller 102 determines that the driving state of the vehicle 1 is a state in which a driving force is generated, the controller 102 may select wheel speed information including a slowest wheel speed from among the wheel speed information of the at least wheel.

The state in which the driving force is generated may include a case in which the vehicle 1 starts being driven. The driving force may be generated when all of the four wheels 12 and 13 are driven or when two of the wheels 12 and 13 are driven.

If there is a wheel to which no driving force is transferred, the controller 102 may select wheel speed information including a wheel speed of the wheel to which no driving force is transferred. When the vehicle 1 drives two wheels to generate a driving force, and the driving force is transferred to the two wheels directly through a shaft, no slip may occur in the remaining wheels to which the driving force is not transferred directly. The controller 102 may select the wheels to which the driving force is not transferred directly and obtain a speed of the vehicle 1 based on the selected wheels.

If the controller 102 determines that the driving state of the vehicle is a state in which a brake force is generated, the controller 102 may select wheel speed information including a fastest wheel speed from among the wheel speed information of the at least one wheel. If a brake force is generated, the brakes are put on the wheels while no slip situation occurs in the vehicle 1. Accordingly, the controller 102 may determine that the fastest speed among the speeds of the four wheels is closest to the speed of the vehicle 1.

If the controller 102 determines that the driving state of the vehicle 1 is a state in which a predetermined brake control is applied, the controller 102 may apply a weight to the wheel speed information of the at least one wheel based on brake pressure applied to the at least one wheel.

The controller 102 may apply a predetermined weight to the selected wheel speed information, obtain acceleration of the vehicle 1 based on the wheel speed information to which the weight is applied, and integrate the acceleration of the vehicle 1 to obtain a speed of the vehicle 1.

The controller 102 may obtain a friction coefficient of a road on which the vehicle 1 travels and change the weight based on a magnitude of the friction coefficient.

If the controller 102 determines that the driving state of the vehicle 1 is a state in which a predetermined brake control is applied, the controller 102 may apply a weight to the wheel speed information of the at least one wheel based on brake pressure applied to the at least one wheel.

The weight applied by the controller 120 may be decided by a brake pressure, a road friction coefficient, and the like.

The controller 102 may apply a predetermined weight to the selected wheel speed information, obtain acceleration of the vehicle 1 based on the wheel speed information to which the predetermined weight is applied, and integrate the acceleration of the vehicle 1 to obtain a speed of the vehicle 1.

The controller 102 may obtain a friction coefficient of a road on which the vehicle 1 travels and change the weight based on a magnitude of the friction coefficient.

The controller 102 may change the weight based on brake pressure applied to the at least one wheel.

The controller 102 may be configured with memory (not shown) to store an algorithm for controlling operations of the components in the vehicle 1 or data of a program for executing the algorithm. The controller 102 may also be configured with a processor (not shown) to perform the operations using the data stored in the memory. The memory and the processor may be implemented as separate chips or a single chip.

Meanwhile, the controller 102 may include an integral estimator 102-1 to estimate a speed of the vehicle 1 by integrating acceleration based on a wheel speed, and may include a wheel speed-based estimator 102-2 to estimate a speed of the vehicle 1 based on a wheel speed. The integral estimator 102-1 and the wheel speed-based estimator 102-2 may be implemented as separate processors or as a single processor.

The controller 102 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium (for example, Hard Disk Drive (HDD) and Compact Disc Read Only Memory (CD-ROM)), although not limited to these. The controller 102 may be memory implemented as a separate chip from the above-described processor, or the controller 102 and the processor may be integrated into a single chip.

At least one component may be added or removed in correspondence to the performance of the components of the vehicle 1 as shown in FIG. 3. Also, it will be understood by one of ordinary skill in the art that the relative locations of the components can change in correspondence to the performance or structure of the system.

Meanwhile, each of the components shown in FIG. 3 means a hardware component, such as software and/or Field Programmable Gate Array (FPGA) and Application Specific Integrated Circuit (ASIC).

Figure 4:
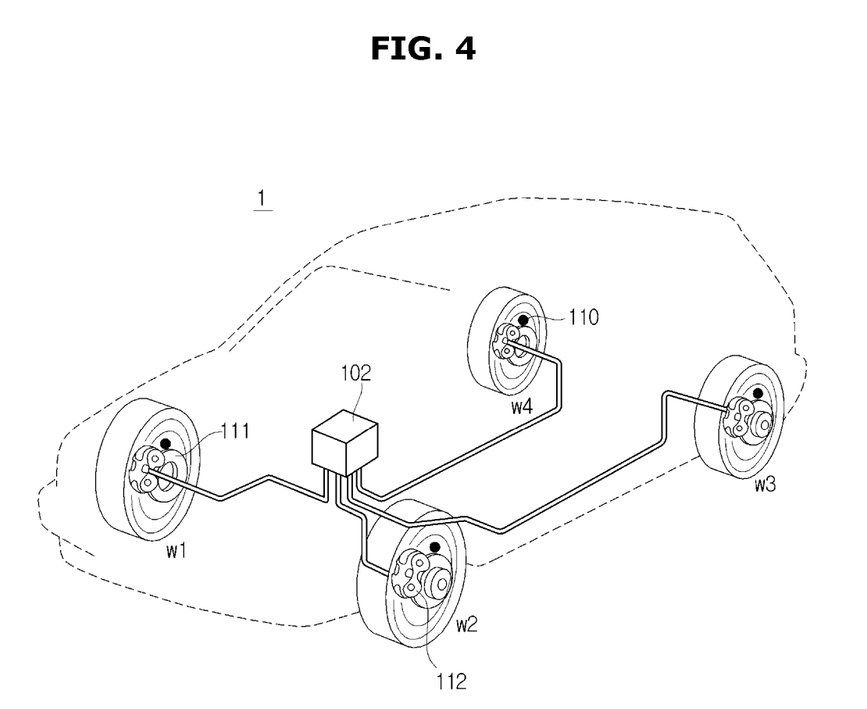
FIG. 4 schematically shows brakes of a vehicle according to an embodiment of the present disclosure.

FIG. 4 schematically shows brakes of a vehicle according to an embodiment of the present disclosure.

Referring to FIG. 4, the vehicle 1 may include a brake system. The brake system may be composed of the controller 102, a Hydraulic Control Unit (HCU), a plurality of sensors 110 for sensing the speeds of the wheels 12 and 13, a Pedal Travel Switch (PTS) for sensing a braking state, a plurality of disc brakes 111, and a plurality of calipers 112.

The disc brakes 111 may acquire a brake force by compressing pads on both sides of discs rotating together with the wheels 12 and 13 and then producing friction. A sealed drum brake can compensate for a disadvantage that the drum expands due to friction heat if used frequently.

Main components of the brake system may include discs rotating together with wheel hubs, pads pressing the discs to produce a friction force, wheel cylinders to which oil pressure is applied, and the calipers 112 to accommodate the wheel cylinders.

The calipers 112 may activate the brakes of the front wheels 12 by pressing the pads of the vehicle 1 onto the disc brakes 111. The calipers 112 may operate by oil or brake fluid pressure. The calipers 112 may have a shape surrounding the brake discs of the front wheels 12. When the brakes are activated, fluid pressure may be applied to the master cylinder and brake fluid inside the cylinder may generate fluid pressure so that a force is generated in left and right directions in the inside of the cylinder. At this time, a force generated in the left direction may make the piston slide to press the inside pad onto the disc, and a force generated in the right direction may make the housing slide to the right. Thereby, the outside pad may be pressed onto the disc to produce a friction force simultaneously with the inside pad.

When the brakes are released, the piston may return to its original location due to the restoring force of the seal piston, and the inside pad may maintain a gap with the disc by a rotation of the disc. Simultaneously, the pressing force applied to the outside pad may be released by the sliding of the housing so that the outside pad may maintain a gap with the disc, thereby removing residual torque.

A vehicle with an anti-lock braking system (ABS) may include the wheel speed sensor 110 for each wheel and may analyze information sensed by the wheel speed sensor 110 to pump any locked wheel so as to balance the four wheels. Accordingly, a skid phenomenon in which a vehicle skids can be prevented to maintain a control force. Also, a braking distance can be significantly shortened since no wheel is locked.

The wheel speed sensors 110 may be respectively installed in the four front and rear wheels 12 and 13. The wheel speed sensors 100 may be configured to sense the speeds of the wheels 12 and 13 based on changes in lines of magnetic force in the sensors 110 and a tone wheel. The wheel speed sensors 110 may be configured to input the speeds of the wheels 12 and 13 to a computer. The controller 102 may calculate a driving distance for each driving situation, based on the speeds of the wheels 12 and 13 acquired by the wheel speed sensors 110, which are described further below. More specifically, the controller 102 may derive a driving state of the vehicle 1, based on a driving distance per unit time measured by the wheel speed sensors 110, which is also described further below. Also, the wheel speed sensors 110 may measure the RPM of the wheels 12 and 13, and the controller 102 may calculate differences in RPM between the four wheels 12 and 13 to determine whether a road is slippery.

Figure 5:
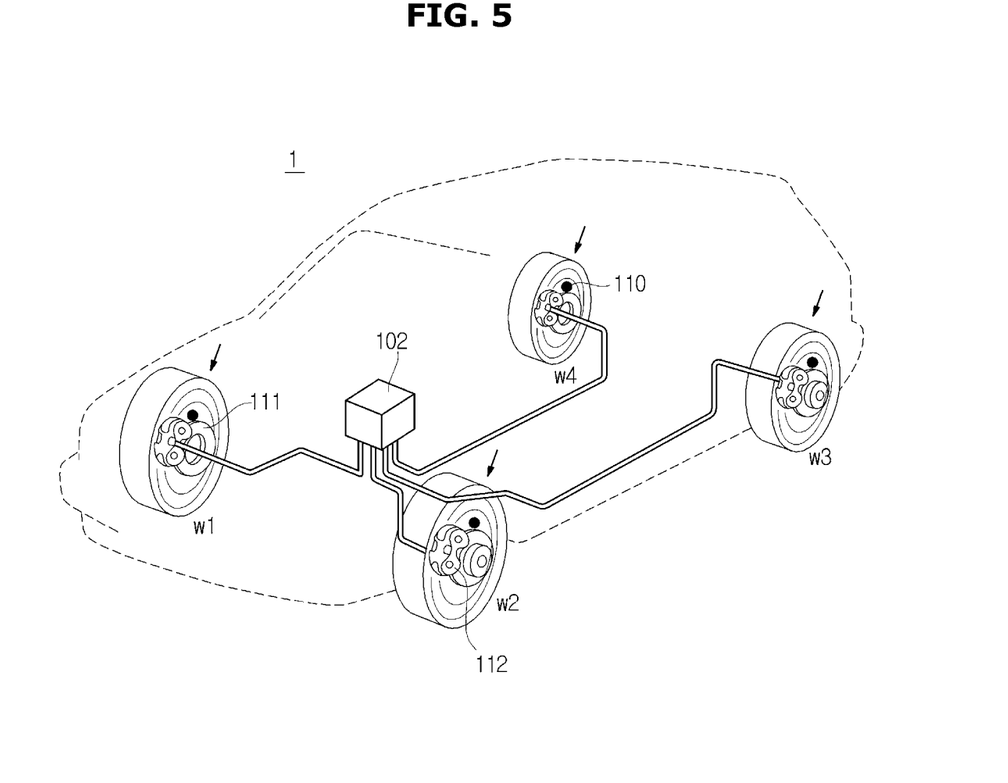
FIGS. 5-7 are views for describing an operation for selecting wheels to be used to obtain a speed of a vehicle according to an embodiment of the present disclosure.
Figure 6:
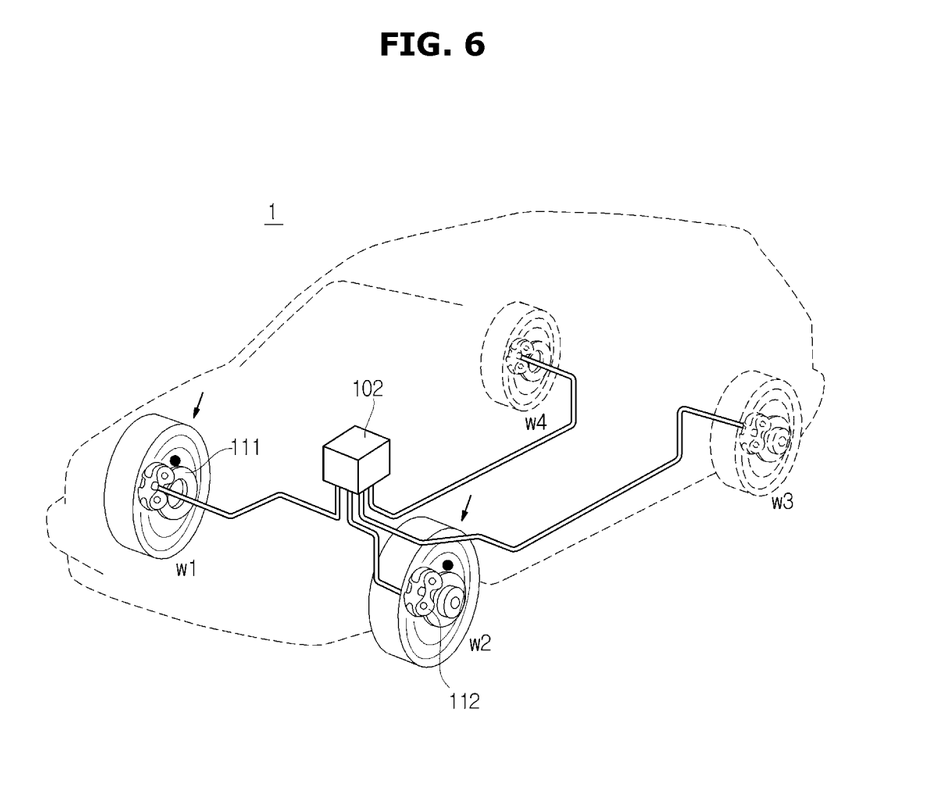
Figure 7:
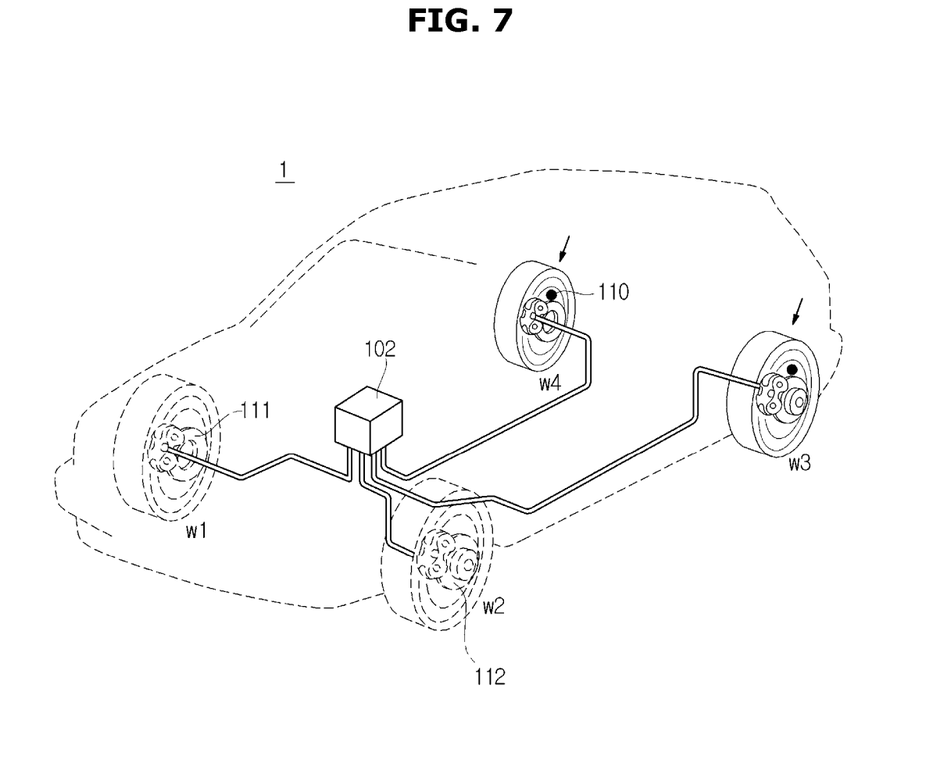

FIGS. 5-7 are views for describing an operation for selecting wheels to be used to obtain a speed of a vehicle according to an embodiment of the present disclosure.

In a method of controlling the vehicle 1, which is described below, the controller 102 may receive information about a wheel speed of the vehicle 1, a brake input value, a steering angle, acceleration, a yaw rate, and a road state.

There are two methods for obtaining a speed of the vehicle 1 using a wheel speed.

The first one of the methods may be to directly obtain a speed of a vehicle using wheel speeds. The controller 102 may correct a yaw rate and a steering angle based on wheel speeds obtained by the sensors 110. Also, the controller 102 may select a wheel having a speed that is closest to a speed of the vehicle 1, based on driving and braking states according to the above-described operations. The controller 102 may remove wheel speed information of wheels slipping to rotate excessively or locked for braking from among the wheels 12 and 13. Also, the controller 102 may filter out noise included in the wheel speed information. According to an embodiment, the controller 102 may filter out noise of a wheel speed using a low pass filter. The controller 102 may estimate a speed of the vehicle 1 based on the wheel speed obtained according to the above-described operations.

The second one of the methods may be to integrate acceleration to obtain a speed of the vehicle 1.

The method of integrating acceleration to detect a speed of the vehicle 1 may be expressed by Equation (1) below.

$$\frac{dV}{dt} = a_x + w_z v_y + g\sin(\theta) + L(V_{wheel} - V) \quad (1)$$

In Equation (1), V represents a speed of the vehicle 1, $a_x$ represents lateral acceleration of the vehicle 1, g represents acceleration of gravity, L represents a predetermined constant to be used to change a weight of a wheel speed $V_{wheel}$, and θ represents an angle of a slope at which the vehicle 1 is located.

The controller 102 may calculate a speed of the vehicle 1 by integrating both sides using Equation (1). However, the wheel speed $V_{wheel}$ may be selected as a value of fast reliability, like the first method. Hereinafter, an operation of deciding a wheel speed required in the first and second methods is described in more detail.

In FIG. 5, a case in which the vehicle 1 travels in four-wheel drive is shown. FIG. 5 shows a case in which the four wheels W1 to W4 of the vehicle 1 are driven.

In the case of FIG. 5, when the vehicle 1 generates a driving force, the controller 102 may select a wheel having a slowest wheel speed from among the wheels W1 to W4. When the vehicle 1 generates a driving force, all the wheel speeds of the wheels W1 to W4 may be faster than the speed of the vehicle 1. Accordingly, the controller 102 may select the slowest one from among all the wheel speeds and use the selected wheel speed to obtain a speed of the vehicle 1. When obtaining a speed of the vehicle 1 through integration, the controller 102 may apply a weight using driving torque and a road friction coefficient. More specifically, the vehicle 1 may apply a smaller weight to the wheel speed at faster driving torque and a smaller friction coefficient. Also, the controller 102 may apply a greater weight to the wheel speed at slower driving torque of the corresponding wheel.

When the vehicle 1 generates a brake force, the controller 102 may use a fastest wheel speed of the wheel speeds. When the vehicle 1 generates a brake force, the wheel speeds may be slower than the driving speed of the vehicle 1. Accordingly, the controller 102 may select a fastest wheel speed from among all the wheel speeds. Also, in this case, the controller 102 may obtain a speed of the vehicle 1 through integration using the wheel speed. Specifically, the controller 102 may apply a smaller weight to the wheel speed at faster brake pressure and a smaller friction coefficient.

When the user generates no brake force, and the controller 102 performs brake control, the vehicle 1 may obtain a speed of the vehicle 1 by applying different weights to the individual wheels according to brake pressure of the wheels. When obtaining a speed of the vehicle 1 through integration, the controller 102 may select a speed of a wheel to which no brake control is applied to obtain a speed of the vehicle 1.

FIGS. 6 and 7 are views for describing a case in which a vehicle travels in front-wheel drive and in rear-wheel drive.

If the controller 102 generates a driving force when the vehicle 1 does not travel in front-wheel drive, the controller 102 may obtain a speed of the vehicle 1 using a fastest wheel speed among wheel speeds of the wheels to which the driving force is not transferred directly. Since slip occurs in the wheels to which the driving force is transferred directly, it may be difficult to obtain an accurate speed of the vehicle 1 using the wheel speed of the wheels. Therefore, the controller 102 may obtain a speed of the vehicle 1 using the wheel speed of the wheels to which the driving force is not transferred directly.

Also, when obtaining a speed of the vehicle 1 through integration, the controller 102 may apply a great weight to the speed of the wheels to which the driving force is not transferred directly to calculate a speed of the vehicle 1.

Also, when the user generates a brake force and brake control is performed, the controller 102 may obtain a speed of the vehicle 1 using the method described above with reference to FIG. 5.

Figure 8:
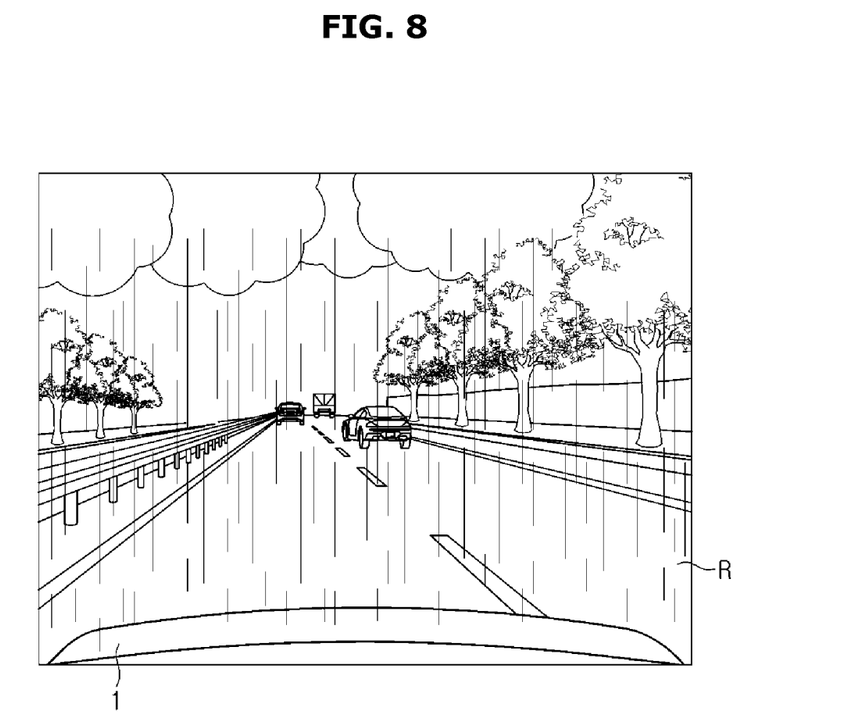
FIG. 8 shows a situation when a vehicle configured according to an embodiment of the present disclosure travels.

FIG. 8 shows a situation when a vehicle configured according to an embodiment of the present disclosure travels.

Referring to FIG. 8, the vehicle 1 may travel when it rains.

A road friction coefficient when it rains may be smaller than a road friction coefficient when it does not rain. When a road R has a small friction coefficient, the speeds of wheels cannot reflect the speed of the vehicle 1. Accordingly, it is difficult to obtain a speed of the vehicle 1 using the speeds of the wheels. In this case, a small weight may be applied to obtain a speed of the vehicle 1. In FIG. 8, a situation is shown in which the road R is slippery due to rain. However, there may be various situations in which a road is slippery so that a road friction coefficient is reduced.

FIGS. 5-8 relate to some embodiments for describing operations of the present disclosure. However, the operations of the present disclosure are not limited to the above-described operations as long as they can select a wheel capable of sufficiently reflecting the speed of a vehicle and can apply friction of a road to determine the speed of the vehicle.

Figure 9:
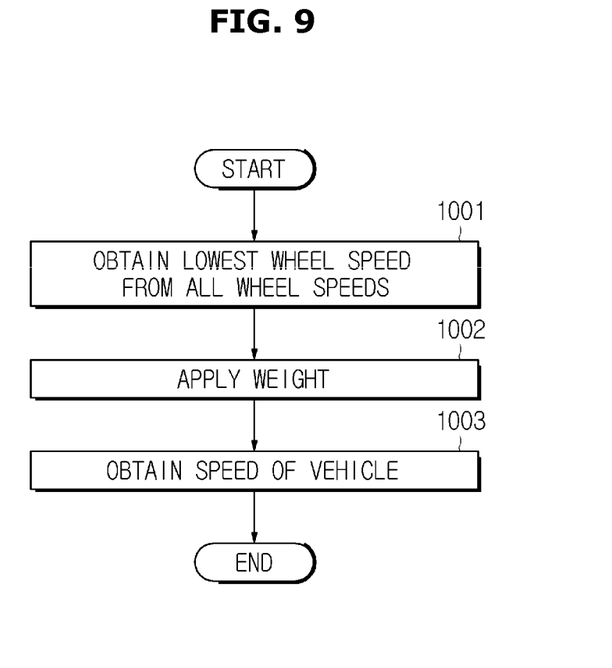
FIGS. 9 and 10 are flowcharts according to embodiments of the present disclosure.
Figure 10:
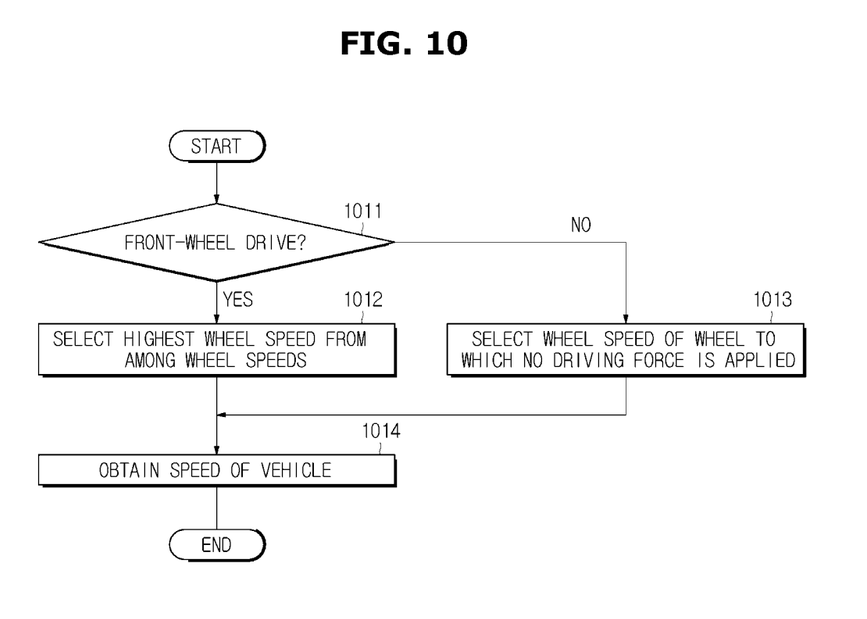

FIGS. 9 and 10 are flowcharts according to embodiments of the present disclosure.

FIG. 9 is a flowchart illustrating a process for deciding a speed of a vehicle when the vehicle stops. The controller 102 may obtain a lowest wheel speed from all wheel speeds of the vehicle 1, in operation 1001. Then, the controller 102 may apply a weight to the wheel speed, in operation 1002. A road friction coefficient and brake pressure may be reflected to apply a weight, as described above. The controller 102 may obtain a speed of the vehicle 1 based on the obtained wheel speed and the wheel speed to which the weight is applied, in operation 1003.

FIG. 10 is a flowchart illustrating a process for deciding a speed of a vehicle when the vehicle is driven.

Referring to FIG. 10, different determinations may be made between when the vehicle 1 is in front-wheel drive mode and when the vehicle 1 is not in the front-wheel drive mode, in operation 1011. When the vehicle 1 is in the front-wheel drive mode, a fastest wheel speed may be selected from among wheel speeds, in operation 1012. If the vehicle 1 is not in the front-wheel drive mode, a wheel speed of a wheel to which no driving force is applied may be selected, in operation 1013.

A speed of the vehicle 1 may then be obtained based on the selected wheel speed, in operation 1014.

As described above, according to the disclosed embodiment of the vehicle and the control method thereof, it is possible to select a wheel speed that is most appropriate to obtain a speed of the vehicle from among wheel speeds of the vehicle to obtain an accurate speed of the vehicle.

The above-described embodiments may be embodied in the form of a recording medium to store commands executable by a computer. The commands may be stored in the form of program codes, and when executed by a processor, the commands can create a program module to perform operations of the embodiments. The recording medium may be embodied as a computer-readable recording medium.

The computer-readable recording medium may include all kinds of recording media storing commands that can be decoded by a computer. For example, the computer-readable recording medium may be Read Only Memory (ROM), Random Access Memory (RAM), a magnetic tape, a magnetic disk, flash memory, an optical data storage device, or the like.

Although a few embodiments of the present disclosure have been shown and described herein, it would be appreciated by those skilled in the art that changes may be made in the disclosed embodiments without departing from the principles and spirit of the disclosure, the scope of which is defined in the claims and their equivalents.

What is claimed is:

1. A vehicle comprising:
   a sensor configured to obtain wheel speed information of at least one wheel; and
   a controller configured to select wheel speed information from among the wheel speed information of the at least one wheel based on a driving state of the vehicle, and to determine a speed of the vehicle based on the selected wheel speed information,
   wherein if the driving state of the vehicle is determined as a state in which a driving force is generated, the controller selects wheel speed information including a slowest wheel speed from among the wheel speed information of the at least one wheel,
   wherein, if a wheel to which the driving force is not transferred exists in the at least one wheel, the controller selects wheel speed information including a wheel speed of the wheel to which the driving force is not transferred,
   wherein, if the driving state of the vehicle is determined as a state in which a predetermined brake control is applied, the controller applies a weight to the wheel speed information of the at least one wheel based on a brake pressure applied to the at least one wheel, and
   wherein the weight applied by the controller is decided by the brake pressure and a road friction coefficient.

2. The vehicle according to claim 1, wherein, if the driving state of the vehicle is determined as a state in which a brake force is generated, the controller selects the wheel speed information including a fastest wheel speed from among the wheel speed information of the at least one wheel.

3. The vehicle according to claim 1, wherein the controller applies a predetermined weight to the selected wheel speed information,
   determines an acceleration of the vehicle based on the selected wheel speed information to which the predetermined weight is applied, and
   integrates the acceleration of the vehicle to determine the speed of the vehicle.

4. The vehicle according to claim 3, wherein the controller obtains the road friction coefficient of a road on which the vehicle travels and changes the predetermined weight based on a magnitude of the road friction coefficient.

5. The vehicle according to claim 3, wherein the controller changes the predetermined weight based on the brake pressure applied to the at least one wheel.

6. A method of controlling a vehicle, the method comprising:
   obtaining wheel speed information of at least one wheel;
   selecting wheel speed information from among the wheel speed information of the at least one wheel based on a driving state of the vehicle; and
   determining a speed of the vehicle based on the selected wheel speed information,
   wherein the selecting of the wheel speed information from among the wheel speed information of the at least one wheel comprises, if the driving state of the vehicle is determined as a state in which a driving force is generated, selecting wheel speed information including a slowest wheel speed from among the wheel speed information of the at least one wheel,
   wherein the selecting of the wheel speed information from among the wheel speed information of the at least one wheel comprises, if a wheel to which the driving force is not transferred exists in the at least one wheel, selecting wheel speed information including a wheel speed of the wheel to which the driving force is not transferred,
   wherein the determining of the speed of the vehicle comprises, if the driving state of the vehicle is determined as a state in which a predetermined brake control is applied, applying a weight to the wheel speed information of the at least one wheel based on a brake pressure applied to the at least one wheel, and
   wherein the weight applied to the wheel speed information is decided by the brake pressure and a road friction coefficient.

7. The method according to claim 6, wherein the selecting of the wheel speed information from among the wheel speed information of the at least one wheel comprises, if the driving state of the vehicle is determined as a state in which a brake force is generated, selecting the wheel speed information including a fastest wheel speed from among the wheel speed information of the at least one wheel.

8. The method according to claim 6, wherein the determining of the speed of the vehicle comprises:
   applying a predetermined weight to the selected wheel speed information;
   determining an acceleration of the vehicle based on the selected wheel speed information to which the predetermined weight is applied; and
   integrating the acceleration of the vehicle to determine the speed of the vehicle.

9. The method according to claim 8, wherein the determining of the speed of the vehicle comprises:

obtaining the road friction coefficient of a road on which the vehicle travels; and changing the predetermined weight based on a magnitude of the road friction coefficient.

10. The method according to claim 8, wherein the determining of the speed of the vehicle comprises changing the predetermined weight based on the brake pressure applied to the at least one wheel.

* * * * *